United States Patent [19]

Poa et al.

[11] Patent Number: 4,544,616
[45] Date of Patent: Oct. 1, 1985

[54] SECONDARY BATTERY CONTAINING ZINC ELECTRODE WITH MODIFIED SEPARATOR AND METHOD

[75] Inventors: David S. Poa, Naperville; Neng-Ping Yao, Clarendon Hills, both of Ill.

[73] Assignee: The United States of America as represented by the United States Department of Energy, Washington, D.C.

[21] Appl. No.: 580,982

[22] Filed: Feb. 16, 1984

[51] Int. Cl.[4] .............................................. H01M 2/16
[52] U.S. Cl. .................................... 429/229; 429/248; 427/430.1
[58] Field of Search ............... 429/248, 198, 216, 250, 429/247, 229; 427/430.1

[56] References Cited

U.S. PATENT DOCUMENTS

| | | | |
|---|---|---|---|
| 2,897,250 | 7/1959 | Klopp | 429/198 |
| 3,291,646 | 12/1966 | Gould | 429/198 |
| 3,660,170 | 5/1972 | Rampel | 429/198 |
| 3,923,550 | 12/1975 | Krusenstierna | 429/68 |
| 3,929,509 | 12/1975 | Taskier | 429/250 |
| 3,930,882 | 1/1976 | Ohsawa et al. | 429/216 |
| 3,944,430 | 3/1976 | Lee | 429/216 |
| 4,015,053 | 3/1977 | Krusenstierna | 429/49 |
| 4,052,541 | 10/1977 | Krusenstierna | 429/233 |
| 4,377,625 | 3/1983 | Parsen et al. | 429/198 |

OTHER PUBLICATIONS

Burris et al., Chemical Tech. Div. Annual Tech. Report 1982, ANL-83-55.

Primary Examiner—Donald L. Walton
Attorney, Agent, or Firm—Hugh W. Glenn; Robert J. Fisher; Judson R. Hightower

[57] ABSTRACT

A battery containing a zinc electrode with a porous separator between the anode and cathode. The separator is a microporous substrate carrying therewith an organic solvent of benzene, toluene or xylene with a tertiary organic amine therein, wherein the tertiary amine has three carbon chains each containing from six to eight carbon atoms. The separator reduces the rate of zinc dentrite growth in the separator during battery operation prolonging battery life by preventing short circuits. A method of making the separator is also disclosed.

20 Claims, 1 Drawing Figure

SECONDARY BATTERY CONTAINING ZINC ELECTRODE WITH MODIFIED SEPARATOR AND METHOD

CONTRACTUAL ORIGIN OF THE INVENTION

The U.S. Government has rights in this invention pursuant to Contract No. W-31-109-ENG-38 between the U.S. Department of Energy and Argonne National Laboratory.

BACKGROUND OF THE INVENTION

This invention relates a secondary alkaline battery having a zinc negative electrode and a microporous membrane separator and more particularly to a nickel-zinc battery containing same. Nickel/zinc batteries are one of the more promising batteries for electrical cars and various military vehicles, the advantages including a relatively high energy density and constant voltage output. In addition, a zinc anode containing cell or battery has other advantages, for example, a high energy to weight ratio and a low price. There are problems associated with the use of zinc anodes, particularly regarding the life of the secondary cell or battery, all of which result from the special properties of zinc in an alkaline electrolyte. Typically, electrolytes used in these batteries are hydroxides and particularly alkali metal hydroxides which may be saturated with zinc oxide.

The zinc anode is a so-called dissoluble electrode, which during the discharge reaction forms products soluble in the electrolyte. These products leave the anode mainly as zincate ions which then may react further in the electrolyte. Zincate ions then form zinc oxide which has a much lower solubility in the electrolyte than the zincate ions. Zinc oxide thereafter may precipitate as a solid. The main reactions during the discharge of the zinc electrode and the precipitation of the zinc oxide are the following:

$$Zn + 4\,OH^- = Zn(OH)_4^{2-} + 2e^-$$

$$Zn(OH)_4^{2-} = ZnO + H_2O + 2OH^-$$

Other reactions and other types of ions are present, but the above reactions are the dominating reactions and illustrate the main reactions in the secondary cell.

One of the most significant problems with zinc electrodes and accordingly the nickel-zinc battery, results from the redeposition of zinc on the electrodes during the charging process during which time the zinc to a major extent forms zinc dentrites which have a tendency to grow toward the counter electrodes and cause a short circuit in the cell.

Different methods have been tried to solve these problems with the use of a semipermeable membrane between the zinc electrode and the counter electrode being a common configuration in the art. One such method is illustrated in a series patents to von Krusenstierna relating to vibrating the electrodes to avoid the dentrite formation, see U.S. Pat. No. 3,923,550 issued Dec. 2, 1975; U.S. Pat. No. 4,015,053 issued Mar. 29, 1977; U.S. Pat. No. 4,052,541 issued Oct. 4, 1977. Other methods include using different kinds of additives in the electrolyte to prevent dentrite growth on the membrane and electrodes. As reported by von Krusenstierna these attempts have not met with significant success.

SUMMARY OF THE INVENTION

Accordingly, it is a principal object of the present invention to provide a modified separator for a zinc-electrode containing secondary battery and particularly a zinc-nickel battery which enhances the cell life by retarding the growth of zinc dentrites during operation of the cell and particularly charging.

Another object of the present invention is to provide a battery containing a zinc electrode having a porous separator between the anode and cathode, the improvement comprising providing the separator with an organic tertiary amine to reduce the rate of zinc dentrite growth in the separator during battery operation.

A still further object of the present invention is to provide a separator for a battery having a zinc electrode comprising a microporous substrate carrying therewith an organic solvent of benzene, toluene or xylene with a tertiary organic amine therein, wherein the tertiary amine has three carbon chains each containing from six to eight carbon atoms.

Yet a further object of the present invention is to provide a method of treating a microporous separator in a battery having a zinc electrode to prevent zinc dentrite growth in the separator during battery operating, comprising providing a liquid tertiary amine having three carbon chains with each carbon chain containing from six to eight carbon atoms, and soaking the microporous separator in the liquid tertiary amine.

Additional objects, advantages and novel features of the invention will be set forth in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

The single FIGURE of the drawing is a schematic of a wiring diagram for the zinc penetration test cell used to accumulate the data hereinafter set forth.

Figure 1:
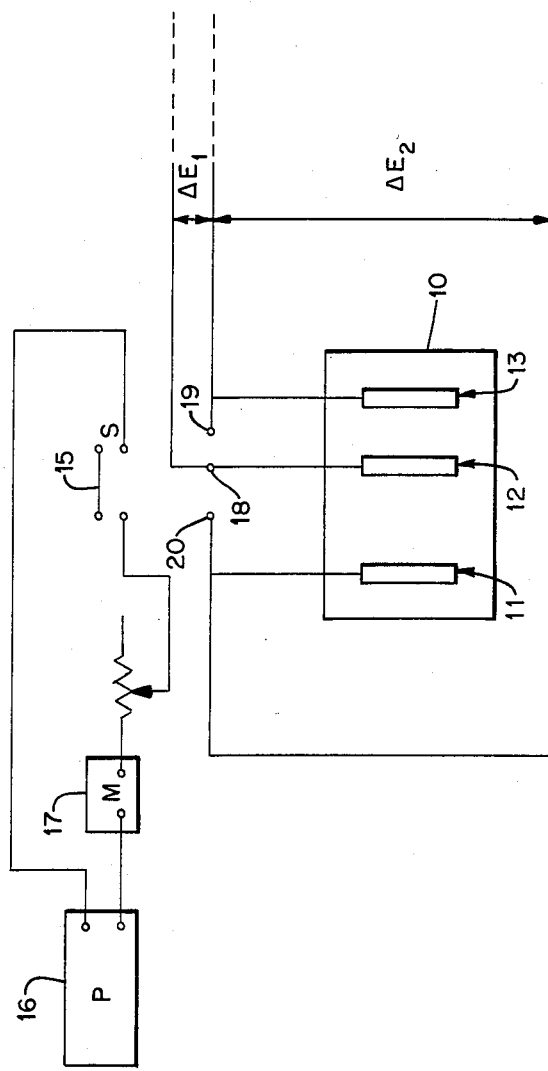

Referring to the FIGURE, there is schematically illustrated a zinc penetration cell 10 having a zinc anode 11, a nickel-hydroxide reference electrode 12 and a zinc cathode 13 in a suitable non-conductive housing such as ABS. Connected to the test cell 10 by means of a switch 15 is a power source 16 and an ammeter 17. Voltage differentials are measured between the terminal 18 of the reference electrode 12 and the terminal 19 of the cathode 13 and voltage differentials are measured between the terminal 20 of the anode 11 and the terminal 19 of the cathode 13. In the data hereinafter reported the voltage differentials between the reference electrode 12 and the cathode 13 is denoted as $\Delta E_1$ and the voltage differential between the anode 11 and the cathode 13 is referenced as $\Delta E_2$.

Several types of microporous membranes have been used, one being a Celanese product sold under the trade designation CELGARD 2400 which is a microporous polypropylene having one side thereof coated with 0.1 mil thick layer of nickel powder and cellulose acetate and the other being a DuPont microporous cellophane sold under the trade designation of 193 PUDO cellophane. An additional celanese CELGARD product sold under the trade designation of CELGARD 3501 was also tested.

In general, the electrolyte was a 30 percent solution of potassium hydroxide saturated with zinc hydroxide and the temperature was maintained at 23° C. Other experiments have used potassium hydroxide electrolyte wherein the potassium hydroxide is present in a concentration in the range of from about 10 percent by weight to about 60 percent by weight; however, the preferred concentration is in the range of from about 10 percent to about 45 percent by weight. Various tertiary amines were tested in an attempt to improve the zinc penetration resistivity of the microporous separator materials by soaking the separators in various organic solutions of tertiary amine complexing agents. It is proposed, without limiting the invention, that the mechanism of carrier mediated transport through the membrane is the diffusion of zincate ions across the membrane coupled to a flow of potassium ions in the same direction as follows:

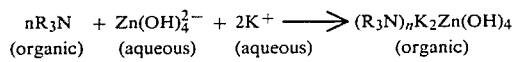

| nR$_3$N | + Zn(OH)$_4^{2-}$ | + 2K$^+$ | $\longrightarrow$ | (R$_3$N)$_n$K$_2$Zn(OH)$_4$ |
|---|---|---|---|---|
| (organic) | (aqueous) | (aqueous) | | (organic) |

This co-transport mechanism consists of the following intermediate steps: (1) on the high concentration side of the membrane, the amine carrier reacts with the zincate and potassium ions to form a complex, (2) the carrier complex diffuses across the membrane, (3) at the product side, where the zincate ion concentration is lower, the reaction (1) is reversed and zincate and potassium ions are released from the carrier amine, (4) the uncomplexed tertiary amine carrier diffuses back across the membrane.

As a consequence of the proposed diffusion mechanism, the zinc dentrite penetration rate through the membranes can be effectively reduced. Zinc penetration is generally believed to result from zinc crystallization within the membrane microstructure with the formation of a conductive zinc metal path through the membrane. Therefore, the complex of amine carrier with zincate ions within the membrane will reduce the rate of metallic zinc crystallization, and thus reduce the chance of formation of metallic conducting path.

A portion of the experimental results are presented in Table 1 set forth below. The data obtained in this study indicate that:

a. Treatment of Celgard 2400 with a (10% trihexylamine +90% benzene) solution can increase the separator's zinc penetration resistivity (ZPR) by about 50–60%, with no observable increase in potential drop between the electrodes.

b. The values of time-to-short and potential drop between the electrodes are both nearly doubled when Celgard 2400 is treated with pure trihexylamine.

c. When the separator is treated with pure tri-n-octylamine, the potential drop between the electrodes increases very sharply, from 300 to 700 percent. Furthermore, the potential drop between the electrodes fluctuated so intensely during the testing period that a clear cut time to short cannot be determined.

d. The treatment of Celgard 2400 with either a (10% trihexylamine +90% xylene) solution or a (10% tri-n-octylamine +90% xylene) solution can increase the separator's ZPR value by about 400%. However, the former solution treatment causes an increase in potential drop between the zinc cathode and Ni(OH)$_2$ counter electrode by about 100%, while the latter solution treatment seems to not only slightly reduce but also to stabilize the potential drop between the electrodes.

TABLE I

Effect of Organic Solution Treatments on Potential Drop Between Electrodes and Zinc Penetration Through Celgard 2400 Separator
Temperature = 23° C.
Electrolyte: 30% KOH solution saturated with ZnO

| Organic Solution Treatment | Potential Drop Between Zinc Cathode and NI (OH)$_2$ Counter Electrode $\Delta E_1$ (V) | Potential Drop Between Zinc Anode and Zinc Cathode $\Delta E_2$ (V) | Time to Short (min) |
|---|---|---|---|
| None | 2.8 | 2.9 | 206 |
| None | 1.9 | 2.1 | 185 |
| None | 1.8 | 0.85 | 160 |
| 10% Trihexylamine + 90% Benzene Soaking Time: 15 min. | 1.92 1.75 | 0.86 1.90 | 310 255 |
| Pure Trihexylamine soaking 15 min. | 3.4 3.4 | 3.5 3.4 | 295 420 |
| Pure Tri-n-octylamine soaking 15 min. | 3.6 6.0 | 4.2 13.5 | cannot be determined cannot be determined |
| 10% Trihexylamine + 90% xylene Soaking Time: 15 min. | 2.75 1.75 | 4.5 4.40 | 695 775 |
| 10% Trihexylamine + 90% xylene Soaking Time: 15 min. | 1.8 2.0 | 1.0 1.3 | 690 735 |

Additional tests have been conducted under the same conditions previously reported in Table I for triethylamine, triheptylamine, trihexylamine, tripentylamine, tripropylamine, tri-n-octylamine, and tridecylamine. In addition, various organic solvents including benzene, cyclohexane, Decalin, Tetralin, toluene, and xylene were also examined. As set forth in Table II, the tests indicated that triethylamine and tripropylamine have negligible effect on the reduction of zinc dentrite penetration rate through the separator membrane while triheptylamine, tripentylamine and tridecylamine reduce the dentrite penetration rate but can cause an undesirably high voltage drop across the electrodes and separator membrane system. The test results also indicate that benzene, toluene and xylene are preferred solvents with xylene being clearly superior as indicated by the data in Tables I and II.

193 PUDO cellophane (DuPont) and a current density of 10 mA. Penetration time obtained from these two tests were 168 minutes and 156 minutes respectively which indicate that the penetration test cell system works very well. These test also indicate that the DuPont cellophane membrane is uniform and can serve as a reference standard while the Celgard microporous polypropylene film is not uniform and has a lower zinc penetration resistivity than the DuPont cellophane.

TABLE II

Effect of Organic Solution Treatments on Potential Drop Between Electrodes and Zinc Penetration Through Celgard 2400 Separator
Temperature - 23° C.
Electrolyte: 30% KOH solution saturated with ZnO

| Organic Solution Treatment | Potential Drop Between Zinc Cathode and Ni(OH)$_2$ Counter Electrode $\Delta E_1(V)$ | Potential Drop Between Zinc Anode and Zinc Cathode $\Delta E_2(V)$ | Time to Short (min) |
|---|---|---|---|
| None | 1.7–2.9 | 0.85–3.0 | 150–210 |
| 10–25% (volume) trihexylamine 90–75% benzene | 1.7–2.0 | 0.8–1.95 | 255–315 |
| 35–100% trihexylamine + 65–0% benzene | 3.2–3.7 | 3.3–3.6 | 290–430 |
| 10–25% trihexylamine + 90–75% toluene | 2.7–3.3 | 2.1–3.5 | 230–295 |
| 35–100% trihexylamine + 65–0% toluene | 3.5–3.8 | 3.4–4.5 | 265–390 |
| 10–25% trihexylamine + 90–75% xylene | 1.65–2.35 | 4.35–4.5 | 710–765 |
| 35–100% trihexylamine + 65–0% xylene | 3.35–3.5 | 3.1–3.5 | 295–530 |
| 10–25% Tri-n-octylamine + 90–75% toluene | 2.3–2.9 | 1.7–2.9 | 255–320 |
| 35–100% tri-n-octylamine + 65–0% toluene | 2.9–6.0 | 3.7–14.0 | 275–473 |
| 10–25% tri-n-octylamine + 90–75% xylene | 1.75–2.1 | 0.9–1.3 | 683–740 |
| 35–100% tri-n-octylamine + 65–0% xylene | 2.7–5.5 | 3.3–13.2 | cannot be determined because of unstable potential drop |
| 15% (volume) triethylamine 85% xylene | 1.95 | 1.8– | 168 |
| 10% triheptylamine + 90% xylene | 3.25 | 5.20 | 548 |
| 15% tripentylamine + 85% xylene | 3.75 | 6.3 | 475 |
| 15% tripropylamine + 85% xylene | 2.15 | 1.93 | 232 |
| 10% tridecylamine + 90% xylene | 5.8 | 9.7 | 743 |

Additionally zinc penetration rate tests have been conducted on single layer and triple layer separator materials and particularly the Celgard 3501 separator material. The results of these test are set forth in Table III.

TABLE III

Zinc Penetration Studies

| Test No. | Number of Layers of Celgard 3501 | Charge Current mA | Time to short (min) |
|---|---|---|---|
| 1 | 1 | 5 | 110 |
| 2 | 1 | 5 | 64 |
| 3 | 1 | 10 | 2 |
| 4 | 1 | 10 | 10 |
| 5 | 3 | 10 | 36 |
| 6 | 3 | 10 | 260 |

To verify the reliability of the modified penetration test cell system, two test were made using a single layer Six additional penetration tests were done using the modified cell system. DuPont 193 PUDO cellophane membrane was used for all of these tests. The overcharge current was 10 mA (6.2 mA per cm$^2$). The electrolyte was 30% (wt.) KOH saturated with zinc oxide. The penetration test results (represented by the time to short, in minutes) are: 564; 720; 732; 672; 504; and 696 minutes respectively. The average time to short is 648 minutes. The standard deviation of these data is $6 = 92.64$ minutes.

In general, the separators were prepared at ambient temperatures by dipping the microporous substrate into the combination solvent and amine or pure amine for times in the range of between 15–45 minutes. Thereafter the separators were removed and introduced into the test battery. The testing involved charging the battery until a sharp steep drop in the voltage occurred indicating that the battery had shorted. A shorting time of about 184 minutes is estimated to be equivalent to 150–200 battery cycles and preferably for a practical battery life 400–500 cycles is required requiring a shorting time in excess of about 450 minutes.

Another important factor to consider in the data is the increase in potential drop resulting from the treatment of the separator system with the various amines and amine solutions. Preferably, the potential drop should remain at or about the values for the untreated or nontreated separator. Any reduction in the voltage drop is a significant improvement since the batteries' internal resistence would be lower.

While there has been described what at present is considered to be the preferred embodiment of the present invention, it will be apparent that various modifications and alterations may be made without departing from the true scope of the invention which is intended to be covered in the claims appended hereto.

The embodiments of the invention in which an exclusive property or privilege are claimed are defined as follows:

1. In a battery containing a zinc electrode having a porous separator between the anode and cathode, the improvement comprising providing the separator with an organic tertiary amine selected from the class consisting of triheptylamine; trihexylamine; tripentylamine; tri-n-octylamine, and tridecylamine to reduce the rate of zinc dentrite growth in the separator during battery operation.

2. The battery of claim 1, wherein the tertiary amine is trihexylamine.

3. The battery of claim 1, wherein the tertiary amine is tri-n-octylamine.

4. The battery of claim 1, wherein the amine is present in an organic solvent.

5. The battery of claim 4, wherein the solvent is benzene, toluene or xylene.

6. The battery of claim 5, wherein the solvent is xylene.

7. The battery of claim 1, wherein the tertiary amine is tri-n-octylamine in a xylene solvent wherein the amine is present in the range of from about 10 and about 45 percent by volume of the solvent.

8. The battery of claim 7, wherein the amine is present in the range of from about 10 to about 20 percent by volume of the solvent.

9. A separator for a battery having a zinc electrode comprising a microporous substrate carrying therewith an organic solvent of benzene, toluene or xylene with a tertiary organic amine therein, wherein the tertiary amine has three carbon chains each containing from six to eight carbon atoms.

10. The separator of claim 9, wherein the separator is a microporous polypropylene membrane.

11. The separator of claim 9, wherein the substrate is a porous cellophane.

12. The separator of claim 9, wherein the tertiary amine is present in the solvent in the range of from about 10 to about 45 volume percent.

13. The separator of claim 12, wherein the tertiary amine is present in the solvent in the range of from about 10 volume percent to about 20 volume percent.

14. The separator of claim 9, wherein the amine is trihexylamine or tri-n-octylamine.

15. The separator of claim 14, wherein the solvent is xylene.

16. A method of treating a microporous separator in a battery having a zinc electrode to prevent zinc dentrite growth in the separator during battery operation, comprising providing a liquid tertiary amine having three carbon chains with each carbon chain containing from six to eight carbon atoms, and soaking the microporous separator in the liquid tertiary amine.

17. The method of claim 16, wherein the amine is trihexylamine or tri-n-octylamine.

18. The method of claim 16, wherein the amine is present in an organic solvent of benzene, toluene or xylene in an amount in the range of between about 10 to about 45 percent by volume of the solvent.

19. The method of claim 18, wherein the separator is soaked in the solvent for not less than about 15 minutes at ambient temperature.

20. The method of claim 18, wherein the solvent is xylene, and the amine is present in the amount of between about 10 and about 20 volume percent of the solvent.

* * * * *